United States Patent [19]
Holmes et al.

[11] 4,448,824
[45] May 15, 1984

[54] WRAPAROUND PROTECTIVE CLOSURE

[75] Inventors: James C. Holmes, San Francisco; Harvey Bush, Palo Alto; Roger L. Fink, Redwood City, all of Calif.

[73] Assignee: Raychem Corporation, Menlo Park, Calif.

[21] Appl. No.: 344,275

[22] Filed: Jan. 28, 1982

[51] Int. Cl.³ ............................................. B32B 31/26
[52] U.S. Cl. ........................................ 428/33; 156/85; 156/86; 428/57; 428/192
[58] Field of Search ............ 156/85, 86; 174/DIG. 8; 264/230, 342 R; 428/33, 52, 57, 192

[56] References Cited
U.S. PATENT DOCUMENTS

| 2,027,962 | 1/1936 | Currie . | |
|---|---|---|---|
| 3,086,242 | 4/1963 | Cook et al. . | |
| 3,379,218 | 4/1968 | Conde | 174/DIG. 8 |
| 3,455,336 | 7/1969 | Ellis | 138/156 |
| 3,574,313 | 4/1971 | Tanaka | 138/99 |
| 3,770,556 | 11/1973 | Evans et al. | 156/86 |
| 3,783,037 | 1/1974 | Brook et al. | 148/11.5 R |
| 3,802,930 | 4/1974 | Brook et al. | 148/11.5 |
| 4,070,746 | 1/1978 | Evans et al. | 29/450 |
| 4,135,553 | 1/1979 | Evans et al. | 138/141 |
| 4,179,320 | 12/1979 | Midgley et al. | 156/86 |
| 4,200,676 | 4/1980 | Caponigro et al. | 428/57 |

FOREIGN PATENT DOCUMENTS 1506242 4/1978 United Kingdom .

Primary Examiner—Caleb Weston
Attorney, Agent, or Firm—Douglas A. Chaikin; Herbert G. Burkard; Edith A. Rice

[57] ABSTRACT

Disclosed is a wraparound protective closure in sheet form having a specially profiled transverse-edge which is enveloped when the closure is overlappingly wrapped around an elongate substrate and a method of protecting an elongate substrate using said closure. Repeating structural units along the profiled transverse-edge comprise spoiler-edges which run at right angles to the transverse direction of the profiled transverse-edge and cause air trapped along the enveloped, profiled transverse-edge to form into discrete pockets away from the spoiler-edges when the closure is overlappingly wrapped around the elongate substrate instead of forming a continuous channel along the enveloped edge. The wraparound closure is preferably a dimensionally-recoverable wraparound closure, most preferably a heat-shrinkable wraparound closure, and especially a closure comprised of a polymeric composition.

19 Claims, 6 Drawing Figures

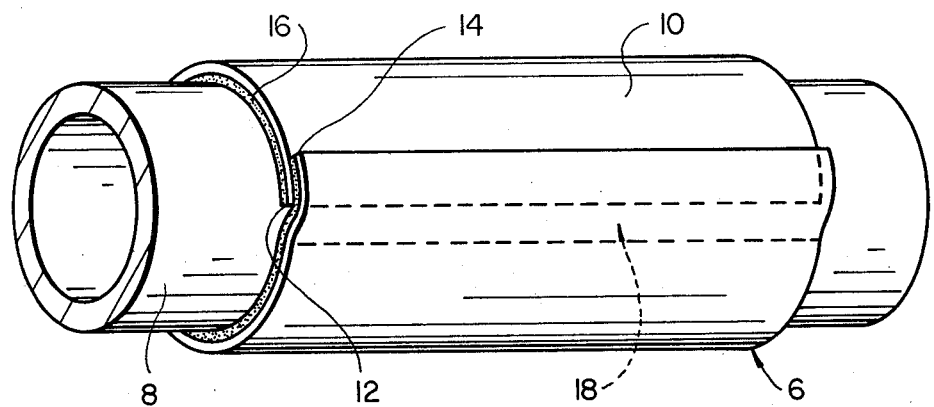
FIG_1 (PRIOR ART)
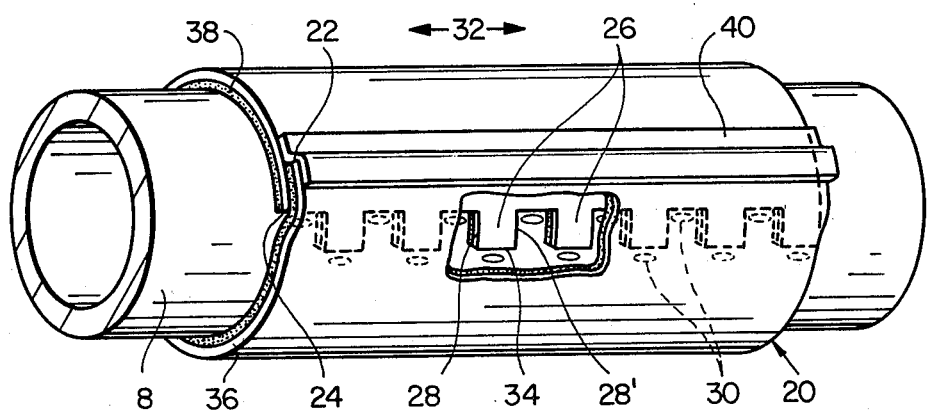
FIG_2
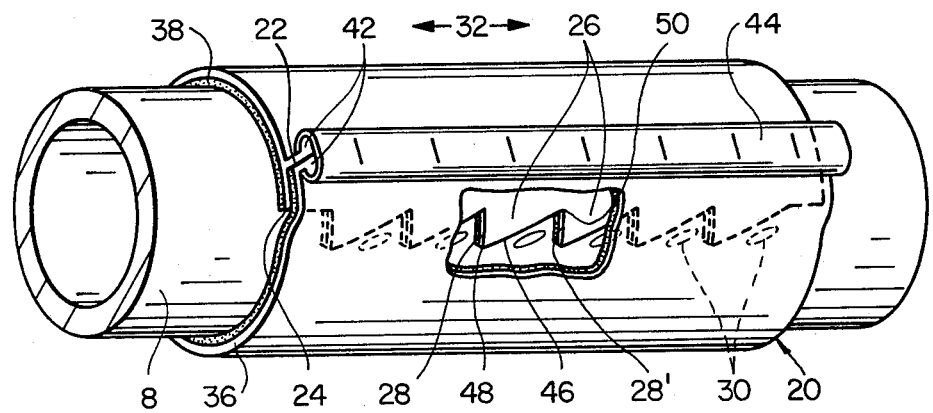
FIG_3

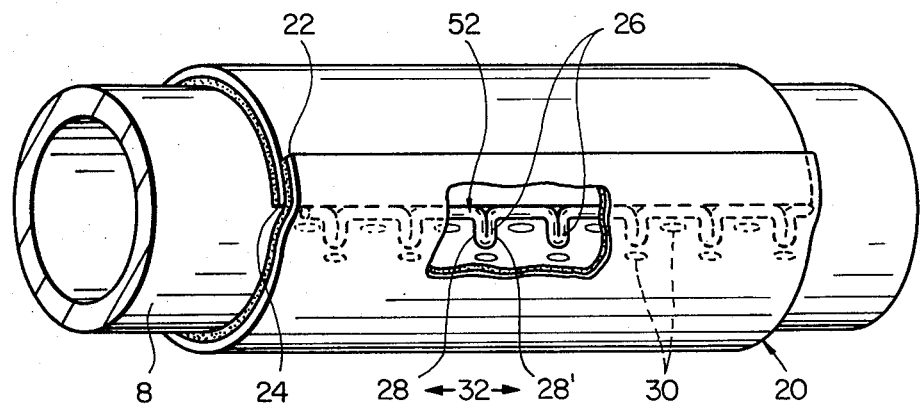
FIG_4
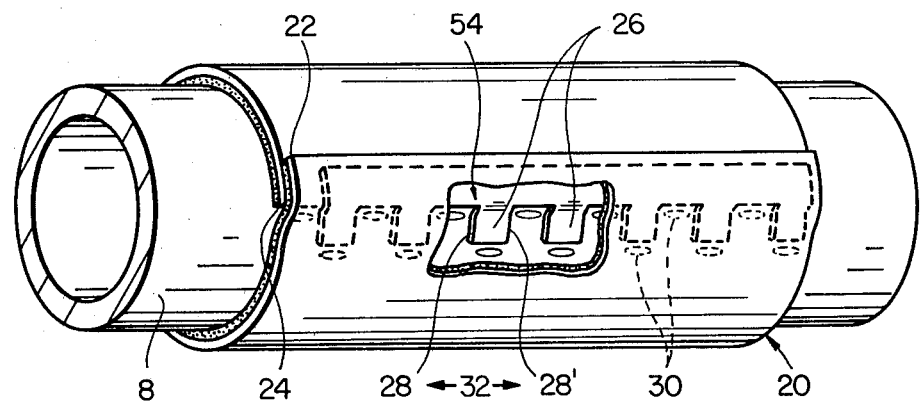
FIG_5
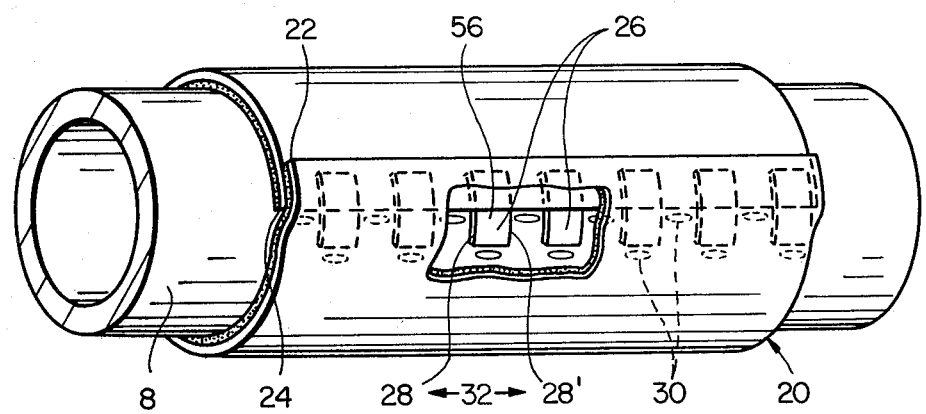
FIG_6

WRAPAROUND PROTECTIVE CLOSURE

BACKGROUND OF THE INVENTION

1. Field of the Invention

This invention relates to protecting an elongate substrate, and more particularly to protecting an elongate substrate with a wraparound protective closure comprising a closure member in sheet form having a profiled transverse-edge which edge is enveloped when the closure is overlappingly wrapped around the substrate.

2. Discussion of the Art

Wraparound protective closures (i.e., wraparound sheets and tapes hereinafter referred to collectively as "sheets" or as "wraparound sheets") are widely used as protective closures in the pipe, electrical power distribution, and telecommunication industries for environmentally sealing and/or electrically insulating a pipe, conduit, cable, or the like. Wraparound sheets for elongate substrates have opposing transverse-edges by definition. When these closures are overlappingly wrapped around an elongate substrate, such as a pipe, conduit, cable, or the like, one transverse-edge is enveloped by the opposing transverse-edge. As the edges are overlapped, the thickness of the underlying layer causes the upper layer to ride up and over the underlying layer forming a bridge, thereby defining a gap or channel in which air can be trapped. This channel is a potential leak-path through which water may permeate and come into direct contact with the elongate substrate in need of protection, particularly if the channel is continuous.

The continuous-channel leak-path problem becomes especially pronounced when the wraparound sheet is fabricated of heat-shrinkable materials. The volume of air trapped as the overlapping edges create a gap, is believed to be augmented by air aspirated into the channel and trapped as dimensional-recovery elongates the bridge-gap. In the case of heat-shrinkable polymeric wraparound sheets for pipes which use mastics as a means to bond the sheet to the pipe, the problem has been observed to become significant at pipe diameters above 10 inches.

Numerous wraparound protective closures are known in the art, refer for example, to U.S. Pat. Nos. 3,455,336 to R. H. Ellis 3,574,313 to K. Tanaka, 3,770,556 to J. H. Evans et al., and 4,200,676 to Caponigro et al., and U.K. Pat. No. 1,506,242 to J. G. Robinson et al., all of which are herein incorporated by reference. Tanaka, Evans et al., and Robinson et al show wraparound sheets having profiled edges, respectively: tabs and slots for closure, slits to prevent buckling during heat recovery, and protrusions and recesses for interlocking engagement. None of these references addresses the channel leak-path problem.

SUMMARY OF THE INVENTION

The purpose of the instant invention is to provide a solution to the channel leak-path problem encountered when wraparound protective closures are overlappingly wrapped around elongate substrates such as pipes, conduits or cables. A channel leak-path is a functional problem primarily when, and in direct proportion to the degree to which the channel is continuous. Trapped air is generally harmless so long as it is trapped in discrete pockets.

To accomplish this purpose, a wraparound protective closure for elongate substrates is provided, comprising: a wraparound closure member in sheet form having opposing transverse-edges, one edge of which is a profiled transverse-edge and is enveloped when the closure member is overlappingly wrapped around an elongate substrate, said profiled transverse-edge having repeating structural units, each unit having at least one spoiler-edge, said spoiler-edges running substantially at right angles to the transverse direction of the profiled transverse-edge and having a length equal to at least twice the thickness of the closure, wherein corresponding spoiler-edges of adjacent repeating structural units are separated by a distance at least twice the length of the spoiler-edges and not more than half of the area between the corresponding edges is occupied.

The wraparound closure member may be a dimensionally-recoverable wraparound closure member, a heat-shrinkable wraparound closure member or in any case, be comprised of a polymeric composition, by way of illustration but not limitation. The closure may further comprise a bonding means interposed between the closure member and the elongate substrate. The bonding means may be comprised of a mastic, an adhesive, a pressure sensitive adhesive, or a hot melt adhesive, by way of illustration but not limitation.

The invention also provides a method of protecting an elongate substrate, comprising the steps of:

(a) providing a wraparound protective closure comprising a closure member in sheet form having opposing transverse-edges, one edge of which is profiled transverse-edge having repeating structural units, each unit having at least one spoiler-edge, said spoiler-edges running substantially at right angles to the transverse direction of the profiled transverse-edge and having a length equal to at least twice the thickness of the closure-member, wherein corresponding spoiler-edges of adjacent repeating structural units are separated by a distance at least twice the length of the spoiler-edge and not more than half of the area between the corresponding edges is occupied, (b) overlappingly wrapping the closure member around the elongate substrate so that the profiled transverse-edge is in physical contact with the substrate and is enveloped by the opposing transverse-edge; and (c) simultaneously causing air trapped along the enveloped transverse-edge to form into discrete pockets away from the spoiler-edges as the closure is overlappingly wrapped.

When the wraparound closure member is a dimensionally-recoverable wraparound closure member, the method previously described comprises the steps of providing a dimensionally-recoverable wraparound protective closure and may further comprise the step of causing dimensional-recovery of the closure member, which brings the closure into intimate contact with the substrate. When the closure member is heat-recoverable, recovery is caused by heating the member. In any case, the method may further comprise the step of interposing a bonding means between the closure member and the substrate before overlappingly wrapping the closure member around the substrate.

BRIEF DESCRIPTION OF THE DRAWINGS

The invention may be better understood by referring to the detailed description of the invention when taken in conjunction with the accompanying drawing in which:

FIG. 1 is a perspective view of a pipe around which has been installed a prior art wraparound closure, illustrating the continuous channel of air typically trapped along the enveloped transverse-edge as the sheet is overlappingly wrapped around the pipe.

FIG. 2 is a perspective view of a pipe protected by a wraparound protective closure having a profiled transverse-edge in accordance with this invention. The enveloped transverse-edge has repeating structural units cut into the edge, as shown in partial break-away. Shown also are the typical positions of discrete air pockets trapped on installation.

FIG. 3 is a perspective, partial break-away view of a pipe protected by a wraparound protective closure having another profiled edge in accordance with this invention cut into the edge of the closure.

FIG. 4 is a perspective partial break-away view of a pipe protected by a wraparound protective closure having yet another profiled edge in accordance with this invention. A metal wire, bent into a fringe of repeating structural units is juxtaposed to the transverse-edge to be enveloped to provide the profiled transverse-edge.

FIG. 5 is a perspective, partial break-away view of a pipe protected by a wraparound protective closure having yet another profiled edge in accordance with this invention. A metal foil fringe is shown placed on the surface of the closure remote the elongate substrate, straddling the transverse-edge to be enveloped, thereby forming the profiled transverse-edge.

FIG. 6 is a perspective, partial break-away view of a pipe protected by a wraparound protective closure having still another of the profiled edge embodiments according to this invention. The profiled transverse-edge was created by affixing strips of compressible foam to the surface of the closure closest to the pipe, so as to straddle the transverse-edge and partially contact the pipe when the closure is overlappingly wrapped around said pipe.

DETAILED DESCRIPTION OF THE INVENTION

The wraparound protective closures of this invention are in sheet form. The use of the word "sheet" or the words "sheet form" is meant to include sheets of any shape, such as those which have been die cut to fit the general contours of an elongate substrate having a diameter which varies along its length, or those which, while being rectangular, are very long in length and commonly referred to as "tapes". Regardless of the shape of the sheets of this invention, they are wraparound sheets and by definition have opposing edges capable of being overlappingly wrapped. These edges are herein referred to as opposing transverse-edges, since the closures of this invention protect elongate substrates and the overlapped closure edges extend generally parallel to (or at least toward, in the case of tape) the transverse (i.e., axial or lengthwise) direction of the elongate substrate. The sheets of this invention may be flat sheets, may have protuberences integral thereto, such as for closure purposes, or may be threaded through closure fastening means, such as clips, but in any event, they must have opposing transverse-edges as previously defined which are overlappingly wrapped.

The wraparound protective closures of this invention are overlappingly wrapped around elongate substrates such as pipes, conduits, cables, or the like. Elongate substrates may be characterized as having a circumferential or radial direction and a transverse or axial direction extending at right angles to one another by definition. The use of the phrase "overlappingly wrapped around" refers herein to surrounding a lengthwise (i.e., transverse or axial) portion of the surface of an elongate substrate with a wraparound sheet (as previously defined) so as to completely surround the entire circumferance of that lengthwise portion by placing one of the opposing transverse-edges in physical contact with the substrate so that it extends along the substrate in a direction that is generally parallel to, but in all cases forming an angle of less than about 90° with the axis of the substrate, and by enveloping that transverse-edge (herein referred to as the "enveloped transverse-edge") by clothing the wraparound sheet around the circumferance of the substrate so that at least a portion thereof extends over and past the enveloped transverse-edge.

When a wraparound sheet according to this invention is a rectangular sheet having straight edges, the transverse-edge to be enveloped extends in a direction which is substantially parallel to the axis of the substrate. When the sheet is an irregular die out sheet, the transverse-edge to be enveloped extends in a direction which is generally parallel to the axis of the substrate. When the sheet is in tape form, the transverse edge to be enveloped is one of the long edges of the tape and the transverse-edge extends is a direction which forms an angle of less than 90° with the axis of the substrate, since the tape is spirally wound around the circumferance of the substrate, with the transverse-edge to be enveloped, being enveloped by the next winding of the tape.

When a wraparound sheet according to this invention is "overlappingly wrapped around an elongate substrate," it may be positioned either on the external surface of a substrate or on the internal surface of a hollow substrate. The continuous-channel leak-path problem as previously discussed may be problematic whether the protective closure is applied as an "oversleeve" (i.e., positioned on the external surface of the substrate) or as a "liner-sleeve" (i.e., positioned on the internal surface of the substrate). That is so because a continuous channel of air may be trapped along the enveloped transverse-edge in either case.

The wraparound protective closures of this invention may be composed of any material or composite of materials capable of existing in sheet form as defined herein. For example, sheets of the same or differing composition may be juxtaposed and/or laminated together under heat and pressure. Alternately, materials may be blended into a mixture and/or reacted and subsequently be formed into sheets, such as by casting, extruding, calendaring, etc. Polymeric compositions are especially preferred.

The closure is preferably fabricated from materials which may be rendered dimensionally-recoverable, which materials are well known and can be formed into articles such as sheets by known methods and caused to recover to a remembered shape by any of several methods. Polymeric heat-recoverable materials and articles formed therefrom are disclosed, for example, in U.S. Pat. Nos. 2,027,962 to Currie and 3,086,242 to Cook et al., both of which are herein incorated by reference. The dimensionally-recoverable material can be, for example, polyethylene, polyvinyl chloride, polyvinylidene fluoride, or the like. Cross-linked polyethylene is preferred.

"Memory metal" heat-recoverable materials and articles formed therefrom are disclosed for example in U.S. Pat. Nos. 3,783,037 to Brook et al. and 3,802,930 to Brook et al., both of which are herein incorporated by reference. The dimensionally-recoverable material can be, for example various alloys of titanium and nickel, beta-brass alloys, and 304 stainless steels.

Dimensionally-recoverable articles are also known which do not require the application of heat. Such articles are disclosed, for example, in U.S. Pat. Nos. 4,070,746 to Evans et al., 4,135,553 to Evans et al. and 4,179,320 to Midgley et al., all of which are herein incorporated by reference.

The wraparound protective closures of this invention are most preferably fabricated from materials which may be rendered into heat-shrinkable articles such as those referenced in the preceding paragraphs. Such heat-shrinkable articles have been "locked" into a heat-unstable shape or configuration and may be caused to return to a heat-stable, remembered shape or configuration by the application of heat. Expanded polymeric articles will shrink back to or towards the original heat-stable configuration when heated to a temperature above their crystalline melting temperature, for example, about 115° C. in the case of polyethylene. Deformed memory metal articles will shrink back to or towards the original heat-stable configuration when heated to a temperature above their martensitic to austenitic transition temperature.

The closures according to this invention may further comprise a bonding means interposed between the closure member and the elongate substrate. The bonding means may comprise a mastic and/or an adhesive. When the bonding means comprises an adhesive, it may be (by way of illustration but not limitation) a pressure sensitive adhesive or a hot melt adhesive. When the closure is dimensionally-recoverable and the dimensional-recovery of the closure is accomplished by heating, the bonding means preferably comprises a hot melt adhesive, especially a hot melt adhesive whose tack temperature does not exceed the recovery temperature of the heat-recoverable closure.

The unique feature of the closures of this invention is the profiled transverse-edge. As discussed in more detail hereinafter, the profiled transverse-edge can take many forms. The edge can be formed from a straight transverse-edge, for example, by die-cutting repeating structural units (further defined hereinafter) into the transverse-edge, by juxtaposing a fringe strip to the transverse-edge (such as an fringe strip comprised of bent metal wire or a continuous yarn of organic or inorganic material such as polyester or fiberglass juxtaposed by sewing into the transverse-edge), by overlapping the transverse-edge with a fringe strip (such as a fringe strip comprised of metal foil), or by providing strips (such as foam strips) along the transverse-edge, which straddle the edge and extend perpendicularly out therefrom.

The profiled edges of this invention consist of repeating structural units, each unit having a least one spoiler-edge. Each spoiler-edge runs substantially at right angles to the transverse direction (as previously defined) of the profiled transverse-edge and has a length equal to at least twice the thickness of the closure. Moreover corresponding spoiler-edges of adjacent repeating structural units are separated by a distance of at least twice the length of the spoiler-edge and not more than half of the area between the corresponding edges is occupied.

In a preferred embodiment of this invention the profiled transverse-edge may have repeating structural units comprising a pair of spoiler-edges whose outermost (with respect to the rest of the closure) adjacent points are interconnected by a straight portion which extends at right angles from one spoiler-edge to the other spoiler-edge. In another embodiment, the repeating structural units may comprise one spoiler-edge, adjacent spoiler-edges being connected by a diagonal position which extends from the outermost point of one spoiler-edge to the innermost point of the adjacent spoiler-edge.

A method of protecting an elongate substrate thus may comprise the steps of: (a) providing a wraparound protective closure according to this invention as previously described, (b) overlappingly wrapping the closure around the elongate substrate so that the profiled transverse-edge is in physical contact with the substrate and is enveloped by the opposing transverse-edge, and (c) simultaneously causing air trapped along the enveloped transverse-edge to form into discrete pockets away from the spoiler-edges as the closure is overlappingly wrapped. When the closure is a dimensionally-recoverable wraparound protective closure having a dimensionally-recoverable closure member in sheet form, the closure is overlappingly wrapped as before and the closure member is caused to dimensionally-recover into circumferential contact with the substrate. Air trapped along the enveloped transverse-edge is simultaneously caused to form into discrete pockets away from the spoiler-edges as the closure is overlappingly wrapped and caused to dimensionally-recover.

It is the uniquely profiled transverse-edges of the closures of this invention, as previously described, which cause air trapped along the enveloped transverse-edge to form into discrete pockets away from the spoiler-edges. Prior art closures do not have the benefit of the unique profiles as taught herein and generally cause air trapped along their enveloped transverse-edge to form into a continuous channel or channels, thereby providing a leak-path.

FIG. 1 illustrates a typical prior art wraparound closure shown generally at 6, installed around a pipe 8. The closure 6 in this example consists of a polymeric sheet 10 having opposing transverse-edges 12 and 14, shown as straight edges. Sheet 10 is coated with an adhesive 16. The closure 6 is overlappingly wrapped around pipe 8, adhesive side facing the surface of pipe 8 to be protected (i.e., in this example, the external surface of pipe 8).

The overlapping of transverse-edges 12 and 14 forms a bridge as edge 14 rides up and over the enveloped edge 12, which defines a gap along the enveloped edge 12. A continuous channel of air shown generally at 18 is often trapped in the gap so formed. This channel is a potential leak-path through which water may permeate and come into direct contact with the substrate in need of protection and illustrates the problem addressed and solved by the instant invention.

The continuity of the channel of trapped air destroys the environmental seal between the pipe and closure, thereby allowing moisture to penetrate into areas where it is least tolerated. The leak-path problem is especially pronounced when the closure is fabricated from heat-shrinkable materials. These shrinkable materials have superior environmental sealing capability because of their ability to conform to the underlying substrate, especially if they are polymeric shrinkable materials, but the volume of air trapped as the overlapping edges 12 and 14 create a bridge and gap, is believed to be augmented by air aspirated into the channel and trapped as dimensional recovery elongates the bridge and gap.

The instant invention modifies the closures of the prior art to solve the channel leak-path problem.

Five embodiments of the instant invention are shown in FIGS. 2 through 6. These embodiments eliminate the continuous-channel leak-path problem by providing a profiled transverse-edge having spoiler-edges which causes air trapped in the gap along the enveloped profiled transverse-edge of the closure to form into harmless discrete pockets away from the spoiler-edges. Each wraparound protective closure 20 has a pair of opposing transverse-edges 22 and 24. Transverse-edge 24 is profiled transverse-edge which is enveloped by the opposing transverse-edge 22 as the closure 20 is overlappingly wrapped around an elongate substrate shown as a pipe 8. The profiled transverse-edge 24 of each of the five embodiments, comprises a plurality of repeating structural units 26 along said transverse-edge 24, each structural unit 26 being comprised of at least one spoiler-edge 28. As the closure is overlappingly wrapped, the air trapped along the enveloped and profiled transverse-edge 24 is caused to form into harmless discrete pockets 30 away from the spoiler-edges 28. Thus at least two repeating structural units 26, each having at least one spoiler edge 28 are required by this invention, one for each extremity of the enveloped and profiled transverse-edge 24.

Referring to FIG. 2, the first and preferred embodiment of this invention is illustrated as a closure 20 having a profiled transverse-edge with a castellated configuration i.e., a configuration giving the appearance of a castle tower due to the nature of the repeating structural units 26 cut into the edge. Each structural unit 26 comprises a pair of spoiler-edges 28 and 28', which run substantially at right angles to the transverse direction 32 of the profiled transverse-edge 24 and whose outermost adjacent points are interconnected by a straight portion 34 which extends at right angles from one spoiler-edge 28 to the other spoiler-edge 28'.

The closure 20 is shown in FIG. 2 as a heat-shrinkable polymeric closure member in sheet form 36 onto which has been coated an adhesive 38. After overlappingly wrapping the closure 20 around the pipe 8, so that the profiled transverse-edge 24 is in contact with the pipe 8 and is enveloped by the opposing transverse-edge 22, dimensional-recovery into intimate contact with the pipe 8 is caused by heating the closure member 36 above its characteristic recovery temperature. As the closure member 36 shrinks into physical contact with the pipe 8, air trapped along the enveloped transverse-edge 24 is simultaneously caused to form into discrete pockets 30 away from the spoiler-edges 28. The typical distribution of discrete air pockets 30 for this first embodiment of the instant invention is as shown.

With continuing reference to FIG. 2, a patch 40, such as the patches disclosed in U.S. Pat. No. 4,200,676 to Caponigro et al., previously incorporated by reference, is shown positioned over transverse-edge 22 as a closure means ancillary to the wraparound protective closures 20 according to this invention. This ancillary closure (i.e., patch) is given by way of illustration but not limitation, because many types of ancillary closures are known and may be used with or form part of the wraparound protective closures 20 according to this invention. In FIG. 3, as an additional example, by way of illustration but not limitation, the closure member 36 according to this invention has rail protuberances 42 which cooperate to form a closure means with a channel member 44, such as taught in U.S. Pat. No. 3,455,336 to R. H. Ellis, previously incorporated by reference.

Referring to FIG. 3, a second embodiment of this invention is illustrated as a closure 20 having a profiled transverse-edge with a sawtooth configuration, i.e., a series of right-triangular structural units 26 out into the transverse-edge to form the profiled transverse-edge 24. Each repeating structural unit 26 comprises one spoiler-edge 28 running substantially at right angles to the transverse direction 32 of the profiled transverse-edge 24. Adjacent spoiler-edges 28 and 28', are interconnected by a diagonal portion 46 which extends from the outermost point 48 of the spoiler-edge 28 to the innermost point 50 of the adjacent spoiler-edge 28'. The typical distribution of air pockets 30 for this second embodiment is as shown.

Referring to FIG. 4, a third embodiment of the instant invention is illustrated as a closure 20 wherein the repeating structural unit 26 is provided by a fringe strip shown generally at 52, juxtaposed to the straight transverse-edge to be enveloped, thereby forming the profiled transverse-edge 24. The fringe strip 52 may be comprised of a bent metal wire (as shown), of an organic or inorganic strand or yarn, such as a fiberglass yarn, of a metal foil, or the like. The fringe strip 52 may be attached to the straight transverse-edge by an attachment means, such as by a mastic or an adhesive, by sewing, or by mechanical devices such as hooks. Each repeating structural unit 26 comprises a pair of spoiler-edges 28 and 28'. The typical distribution of discrete air pockets 30 for this third embodiment is as shown.

Referring to FIG. 5, a fourth embodiment of this invention is illustrated as a closure 20 having a profiled transverse-edge wherein the repeating structural units 26 are provided by a fringe strip shown generally at 54, placed on the surface of the closure 20 remote the elongate substrate and straddling the transverse-edge to be enveloped, thereby forming the profiled transverse-edge 24. The fringe strip 54 may be comprised of a metal foil, a fabric (such as a woven fiberglass fabric) cut into a fringe strip, or a continuous strand of yarn formed into a fringe strip. It may be attached to the straight tranverse-edge by an attachment means, such as a mastic or an adhesive. Each repeating structural unit 26 comprises a pair of spoiler-edges 28 and 28'. The typical distribution of discrete air pockets 30 for this fourth embodiment is as shown.

Referring to FIG. 6, a fifth embodiment of this invention is illustrated as a closure 20 wherein the repeating structural units 26, each comprising a pair of spoiler edges 28 and 28', are provided by two or more compressible foam strips 56, each having an adhesive layer 58 (not shown) for securing the foam strip to the surface of the closure which will contact the pipe 8. The foam strips 56 straddle the transverse-edge to be enveloped 24 and extend perpendicularly out from said edge 24. Where only two of the compressible foam strips are employed they are preferably positioned near the outer extremities of the transverse-edge to be enveloped 24. The typical distribution of discrete air pockets 30 for this fifth embodiment is as shown.

While the instant invention has been described by reference to what is believed to be the most practical embodiments, it is to be understood that the invention may embody other specific forms not departing from the spirit of the central characteristics of the invention. It should be understood that there are other embodiments which possess the qualities and characteristics which would generally function in the same manner and should be considered within the scope of this invention. The present embodiments therefore should be considered in all respects as illustrative and not restrictive, the scope of the invention being limited solely to the appended claims rather than the foregoing description and all equivalents thereto being intended to be embraced therein.

What is claimed is:

1. In combination with an elongate substrate, a wraparound closure, comprising:
   A. a dimensionally-recoverable sheet having opposing transverse-edges;
   B. means for preventing a leak path, comprising;
      1. one of the transverse-edges having at least two structural units,
      2. each unit having at least one spoiler-edge, said spoiler-edge substantially perpendicular to the transverse-edge,
      3. each spoiler-edge having a length equal to at least twice the thickness of the sheet,
      4. the spoiler-edges adjacent to each structural unit being separated by a distance at least twice the length of the spoiler-edge, and
   the sheet overlappingly wrapped around the substrate such that the means for preventing a leak path is enveloped between the other transverse edge and the substrate,
   whereby a continuous leak path in the transverse direction is preventedne of the transverse edges having at least two structural units,
      2. each unit having at least one spoiler-edge substantially perpendicular to the transverse-edge, and
      3. each spoiler-edge having a length equal to at last twice the thickness of the sheet; and
   the sheet overlappingly wrapped around the substrate such that the means for preventing a leak path is enveloped between the other transverse edge and the substrate,
   whereby a continuous leak path in the transverse direction is prevented.

2. In combination with an elongate substrate, a wraparound closure, comprising:
   A. a dimensionally-recoverable sheet having opposing transverse-edges;
   B. means for preventing a leak path, comprising:
      1. one of the transverse edges having at least two structural units,
      2. each unit having at least one spoiler-edge substantially perpendicular to the transverse-edge and
      3. each spoiler-edge having a length equal to at least twice the thickness of the sheet; and
   the sheet overlappingly wrapped around the substrate such that the means for preventing a leak path is enveloped between the other transverse edge and the substrate,
   whereby a continuous leak path in the transverse direction is prevented.

3. A wraparound closure according to claim 2, wherein the dimensionally-recoverable sheet is heat-shrinkable.

4. A wraparound closure according to claim 3, wherein the sheet comprises a polymeric composition.

5. A closure according to claim 3, which includes a bonding means between the sheet and the elongate substrate.

6. A closure according to claim 3, wherein the repeating structural units are provided by a fringe strip placed on the surface of the closure remote the elongate substrate and straddling the transverse-edge to be enveloped, thereby forming a profiled transverse-edge.

7. A closure according to claim 6, wherein the fringe strip is comprised metal foil.

8. A closure according to claim 6, which includes an attachment means for attaching the fringe strip to the transverse-edge.

9. A closure according to claim 3, wherein the repeating structural units are provided by two or more compressible foam strips, each having an attachment means for attaching the foam strip to the surface of the closure which will contact the elongate substrate, the foam strips straddling the transverse-edge to be enveloped and extending perpendicularly out from said edge.

10. A closure according to claim 3, wherein each structural unit comprises a pair of spoiler-edges whose outermost adjacent points are interconnected by a straight portion which extends at right angles from one spoiler-edge to the other spoiler-edge.

11. A closure according to claim 3, wherein each repeating structural unit comprises one spoiler-edge, adjacent spoiler-edges being conected by a diagonal portion which extends from the outermost point of one spoiler-edge to the innermost point of the adjacent spoiler-edge.

12. A closure according to claim 3, wherein the repeating structural units are provided by a fringe strip juxtaposed to the transverse-edge to be enveloped, thereby forming a profiled transverse-edge.

13. A closure according to claim 12, wherein the fringe strip is comprised of bent metal wire.

14. A closure according to claim 12, wherein the fringe strip is comprised of a continuous strand of yarn.

15. A closure according to claim 14, wherein the continuous strand of yarn is comprised of fiberglass.

16. A closure according to claim 14, wherein the continuous strand of yarn is juxtaposed to the transverse-edge by sewing therethrough to form the profiled tranverse-edge.

17. A closure according to claim 12, which includes an attachment means for attaching the fringe strip to the transverse-edge.

18. A closure according to claim 17, wherein the attachment means comprises a mastic.

19. A closure according to claim 17, wherein the attachment means comprises an adhesive.

* * * * *

UNITED STATES PATENT AND TRADEMARK OFFICE
CERTIFICATE OF CORRECTION

PATENT NO. : 4,448,324

DATED : May 15, 1984

INVENTOR(S) : JAMES C. HOLMES et al

It is certified that error appears in the above-identified patent and that said Letters Patent are hereby corrected as shown below:

Col. 1, line 11, after traverse-edge, please add a comma -- , --.

Col. 2, line 28, delete "comprlsing" and insert in lieu thereof -- comprising --.

Col. 2, line 31, delete "sald" and insert in lieu thereof -- said --.

Col. 5, line 26, delete "comprlse" and insert in lieu thereof -- comprise --.

Col. 5, line 32, after the, delete "dlmension" and insert in lieu thereof -- dimension --.

Col. 7, line 9, delete "pcckets" and insert in lieu thereof -- pockets --.

Col. 7, line 46, delete "dlmensional-recovery" and insert in lieu thereof -- dimensional-recovery --.

Col. 8, line 6, after 26, delete "out" and insert in lieu thereof -- cut --.

UNITED STATES PATENT AND TRADEMARK OFFICE
CERTIFICATE OF CORRECTION

PATENT NO. : 4,448,824

DATED : May 15, 1984

INVENTOR(S) : JAMES C. HOLMES et al

It is certified that error appears in the above-identified patent and that said Letters Patent are hereby corrected as shown below:

Col. 9, lines 31-44, after prevented, delete "ne of the transverse edges having at least two structural units.
2. each unit having at least one spoiler-edge substantially perpendicular to the transverse-edge, and
3. each spoiler-edge having a length equal to at last twice the thickness of the sheet; and
the sheet overlappingly wrapped around the substrate such that the means for preventing a leak path is enveloped between the outer transverse edge and the substrate,
whereby a continuous leak path in the transverse directed is prevented."

Col. 4, line 24, after extends, delete "is" and insert in lieu thereof -- in --.

Col. 4, line 59, delete "incorated" and insert in lieu thereof -- incorporated --.

Signed and Sealed this

Fourth Day of November, 1986

[SEAL]

Attest:

DONALD J. QUIGG

Attesting Officer     Commissioner of Patents and Trademarks